United States Patent
Nakamura

[19]
[11] Patent Number: 5,871,322
[45] Date of Patent: Feb. 16, 1999

[54] CLAMP SCREW

[75] Inventor: Daijiro Nakamura, Ono, Japan

[73] Assignee: Power Tool Holders Incorporated, Wilmington, Del.

[21] Appl. No.: 860,681

[22] PCT Filed: Dec. 12, 1995

[86] PCT No.: PCT/US95/16101

§ 371 Date: Jun. 10, 1997

§ 102(e) Date: Jun. 10, 1997

[87] PCT Pub. No.: WO96/19677

PCT Pub. Date: Jun. 27, 1996

[30] Foreign Application Priority Data

Dec. 22, 1994 [JP] Japan ................................. 6-341175
Dec. 22, 1994 [JP] Japan ................................. 6-341176

[51] Int. Cl.⁶ .................... F16B 35/06; F16B 37/08
[52] U.S. Cl. .................... 411/432; 411/408; 411/428; 411/917
[58] Field of Search ................................. 411/402, 408, 411/427, 432, 917, 428

[56] References Cited

U.S. PATENT DOCUMENTS

| | | |
|---|---|---|
| 2,704,426 | 3/1955 | Macaulay . |
| 2,784,976 | 3/1957 | Ondeck . |
| 3,756,092 | 9/1973 | Gärtner . |
| 3,894,743 | 7/1975 | Hiroumi . |
| 3,912,411 | 10/1975 | Moffat . |
| 4,176,582 | 12/1979 | Witte . |
| 4,322,190 | 3/1982 | Anderson . |
| 4,434,586 | 3/1984 | Müller et al. . |
| 4,525,097 | 6/1985 | Ziegelmeyer . |
| 4,637,170 | 1/1987 | Block . |
| 4,655,006 | 4/1987 | Block . |
| 4,841,796 | 6/1989 | Teramachi . |
| 4,850,154 | 7/1989 | Grammer et al. . |
| 4,864,884 | 9/1989 | Klinkenberg . |
| 4,941,790 | 7/1990 | Kirn ........................................ 411/432 |
| 4,955,744 | 9/1990 | Barth et al. . |
| 4,976,071 | 12/1990 | Stäbler . |
| 4,980,994 | 1/1991 | Helm et al. . |
| 5,022,188 | 6/1991 | Borst . |
| 5,042,207 | 8/1991 | Kirn . |
| 5,044,643 | 9/1991 | Nakamura . |
| 5,161,334 | 11/1992 | Schaal et al. . |
| 5,175,963 | 1/1993 | Schäfer et al. . |
| 5,177,905 | 1/1993 | Takahashi . |
| 5,259,145 | 11/1993 | Fushiya et al. . |
| 5,261,679 | 11/1993 | Nakamura . |
| 5,388,942 | 2/1995 | Bonacina et al. ........................ 411/432 |

(List continued on next page.)

FOREIGN PATENT DOCUMENTS

| | | |
|---|---|---|
| 0381809A2 | 8/1990 | European Pat. Off. . |
| 0344154B1 | 4/1992 | European Pat. Off. . |
| 0480163A1 | 4/1992 | European Pat. Off. . |
| 0588483A2 | 8/1993 | European Pat. Off. . |
| 0231500B1 | 4/1994 | European Pat. Off. . |
| 2101513 | 3/1972 | France . |
| 163837 | 8/1949 | Germany . |
| 3012836C2 | 9/1985 | Germany . |
| 3824040C1 | 11/1989 | Germany . |
| 3831236A1 | 3/1990 | Germany . |
| 3832624C2 | 8/1990 | Germany . |
| 3903765A1 | 8/1990 | Germany . |
| 3903766A1 | 8/1990 | Germany . |

(List continued on next page.)

*Primary Examiner*—Neill Wilson
*Attorney, Agent, or Firm*—Dority & Manning, P.A.

[57] ABSTRACT

A clamp screw for clamping a rotating member including a threaded member, a flange member axially movable with respect to the threaded member, and an operating ring for actuating the clamping screw. The clamp screw includes a ball screw transmission mechanism between the operating ring and the threaded member, the ball screw transmission mechanism being configured to transfer rotational movement of the operating ring to axial movement of the flange member for actuating the clamp screw.

16 Claims, 4 Drawing Sheets

U.S. PATENT DOCUMENTS

| | | |
|---|---|---|
| 5,466,106 | 11/1995 | Bone et al. . |
| 5,494,368 | 2/1996 | Matthews . |
| 5,518,440 | 5/1996 | Bone . |
| 5,545,078 | 8/1996 | Schulz et al. . |
| 5,567,100 | 10/1996 | Nakamura . |
| 5,577,870 | 11/1996 | Nakamura ............ 411/432 X |
| 5,577,872 | 11/1996 | Nakamura ............ 411/402 X |
| 5,584,753 | 12/1996 | Takahashi . |
| 5,651,726 | 7/1997 | Skogsberg . |

FOREIGN PATENT DOCUMENTS

| | | |
|---|---|---|
| 3903767A1 | 8/1990 | Germany . |
| 4031725A1 | 4/1992 | Germany . |
| 4102420A1 | 7/1992 | Germany . |
| 4209146A1 | 9/1992 | Germany . |
| 4238466C1 | 1/1994 | Germany . |
| 4243328C1 | 6/1994 | Germany . |
| 4305317A1 | 9/1994 | Germany . |
| 57-184610 | 11/1982 | Japan . |
| 4-210308 | 7/1992 | Japan . |
| 7-299742 | 11/1995 | Japan . |
| 7-299743 | 11/1995 | Japan . |
| 7-314328 | 12/1995 | Japan . |
| 825877 | 12/1959 | United Kingdom . |
| 967516 | 8/1964 | United Kingdom . |
| WO8804975 | 7/1988 | WIPO . |
| WO8806075 | 8/1988 | WIPO . |
| WO9000463 | 1/1990 | WIPO . |
| WO9006210 | 6/1990 | WIPO . |
| WO9619677 | 6/1996 | WIPO . |
| WO9725542 | 7/1997 | WIPO . |
| WO9727020 | 7/1997 | WIPO . |

5,871,322

CLAMP SCREW

DETAILED DESCRIPTION

1. Field of Industrial Use

This invention is used as a clamp screw (for example a nut) for clamping a rotating tool such as, for example, the grindstone of a hand-grinder, or a circular hand-saw, to a threaded attachment part (for example a male thread) provided on the drive shaft of an electric tool.

2. Prior Art

When attaching a rotating tool such as said grindstone or circular saw to the drive shaft of an electric tool, in conventional practice a flange and a male thread are formed at the end of the drive shaft, the rotating tool is inserted over this male thread, and a clamp screw formed with a female thread, for example a nut, is screwed on outside of this, this nut then being clamped using a tightening tool such as a wrench.

Since said electric tool is a manual type (portable), when using a wrench for clamping as described above, the alignment of the electric tool is unbalanced, and its work performance deteriorates. Thus if the above-mentioned clamping nut can be attached by rotation using a manual operation only, work performance will be greatly improved. Moreover, clamping using reverse thrust from the use of the rotating tool will be even more effective. However, when the nut is rotated in a manual operation, a loss in clamping force occurs due to the frictional resistance in the thread portion of said male thread and the female thread of the nut, with the difficulty that it is not possible to create a sufficient clamping force using the force of a manual operation alone. Moreover, there is the disadvantage that if the reverse thrust of the rotating tool is used without being checked, too much clamping may occur so that it cannot be removed.

Problems To Be Resolved by the Invention

This invention has as its purpose the provision of a clamp screw in which the loss of clamping force is greatly reduced, a powerful clamping force can be obtained with a small rotational input, a sufficient clamping force can be obtained by a manual operation, and moreover, a sufficient clamping force can be obtained without excessive clamping by making effective use of the reverse thrust of the rotating tool.

Means of Resolving the Problems

The invention of claim 1 of the invention is characterised by being a clamp screw which is provided with a threaded member with a threaded part having a female or male thread formed on a shaft part and which screws onto a threaded attachment part, and with a shaft-shaped peripheral part formed on its outer surface, an operating ring whose inner part is inserted over the shaft-shaped peripheral part of said threaded member, and to which a rotational force is input externally, and a flange ring fitted facing said operating ring so as to freely rotate on said shaft-shaped peripheral part of said threaded member and permitted a slight movement in the axial direction, and in contact with the attached object, thread grooves of the same respective thread pitch being engraved into the inserted and engaged inner and outer surfaces of said threaded member and operating ring, a plurality of balls being fitted into said thread grooves, a restraining ring being installed between said operating ring and flange ring with slight freedom of movement in the axial direction with respect to the threaded member but prevented from rotating, a spring means being fitted between said restraining ring and operating ring, which returns said operating ring to its initial position allowing for the set number of turns in the clamping range, and a dry metal being fitted between said restraining ring and flange ring in contact with both of these and applying the required frictional resistance.

The invention of claim 2 of the invention, in addition to the structure of the invention of claim 1, is characterised by being a clamp screw in which a thrust bearing is fitted between said operating ring and restraining ring.

The invention of claim 3 of the invention, in addition to the structure of the invention of claim 1, is characterised by being a clamp screw in which said balls, in addition to being retained by a retaining ring fitted between the respective thread grooves of the threaded member and the operating ring, are arranged at a mutual distance with adjacent balls in the direction of the thread pitch having their positions spaced along the direction of thread pitch.

The invention of claim 4 of the invention, in addition to the structure of the invention of claim 1, is characterised by being a clamp screw in which a thrust bearing is fitted between said operating ring and restraining ring, an adjustment ring is fitted between said thrust bearing and restraining ring, raised parts being formed on one of the circumferences of the respectively opposing surfaces of said adjustment ring and operating ring, contact parts which are able to slip and are sprung against said raised parts being formed on the other.

With the clamp screw of claim 1 of the invention, when the operating ring is rotated with the threaded part of the threaded member screwed onto the threaded attachment part, until the flange ring comes into contact with the object being attached it rotates in the same way as a single threaded member, as it forms a unit through the assembled resistance of the structural elements. Then when the flange ring comes in contact with the object being attached, the rotation of the threaded member stops and it enters the clamping state, the rotation of the operating ring is screw fed due to the balls moving around the thread grooves, and due to this screw feed the movement of the operating ring creates a pressure against the flange ring through the restraining ring, so that this pressure produces a clamping force on the object being attached. Moreover, the rotation of said operating ring during the screw feed of said operating ring has virtually no frictional resistance due to the movement of the balls around the thread grooves, so that the rotative force of the operating ring can be applied to the flange ring effectively with no loss.

When the object to be attached is fixed as described above, and this attached object is used, the reverse thrust due to the resistance to this use is transmitted to the flange ring, rotating this in the direction of clamping. This reverse rotation is transmitted to the restraining ring through said dry metal until the dry metal slips, and a relative rotation in the direction of clamping is generated between this restraining ring and the operating ring, the mutual clamping force is increased, and due to this increased clamping force (extra clamping) a more effective clamping is obtained.

However, when the reverse rotation is greater than the level at which the coefficient of friction of the dry metal has been set, slippage occurs between this dry metal and the flange ring, thus preventing over-clamping.

When removing the clamp screw, by rotating the operating ring in the opposite direction to the above, the pressure from the said operating ring on the flange ring is released, and the clamping can be loosened, and thereafter it can be removed like a single threaded member. Also there is no loss of rotative power when the operating ring is turned in reverse when loosening it as described above, since the balls move around the thread grooves. Furthermore, when the load is removed from the operating ring on the flange ring side, the operating ring returns to its initial position with respect to the threaded member due to the spring means.

With the clamp screw of claim 2 of the invention, in addition to the effect of the invention of said claim 1, there is virtually no frictional resistance between the operating ring and the restraining ring, so that the rotational force of the operating ring can be transmitted to the flange ring effectively and without loss.

With the clamp screw of claim 3 of the invention, in addition to the effect of the invention of said claim 1, the position of the balls is maintained by the retaining ring, ensuring the balls have a smooth turning movement.

With the clamp screw of claim 4 of the invention, in addition to the effect of the invention of claim 1, when the operating ring enters the clamping state, the adjustment ring also receives the pressure between the operating ring and stops rotating, and due to its stopping a relative rotation takes place between the operating ring and the adjustment ring, and adjustment and an adjustment noise is generated by slippage between the raised parts and the contact part, and the clamping state can be verified by this adjustment and adjustment noise.

According to the invention of claim 1 of the invention, when the flange ring comes into contact with an attached tool, the rotation of the threaded member stops and it enters a clamping state, the rotation of said operating ring during screw feed of the operating ring has virtually no frictional resistance due to the movement of the balls around the thread grooves, so the rotational force of the operating ring can be transmitted effectively and without loss to the flange ring, it is possible to fix the clamp strongly even with a small rotational force, and manual operation can be made to exert a sufficient clamping force.

Moreover, as the dry metal is fitted, a more effective clamping is obtained due to the increased clamping force (extra clamping) resulting from the reverse rotation of the attached object.

In addition, when the reverse rotation is greater than the level at which the coefficient of friction of the dry metal has been set, slippage occurs between this dry metal and the flange ring, thus preventing over-clamping.

According to the invention of claim 2 of the invention, in addition to the effect of the invention of said claim 1, since there is virtually no frictional resistance between the operating ring and the restraining ring during said clamping state because of the thrust bearing, there is no loss in rotational force in said part, and a small operating force such as a hand movement can be made more efficiently and effectively to have sufficient effect as a clamping force.

According to the invention of claim 3 of the invention, in addition to the effect of the invention of said claim 1, since the spacing of the balls in the retaining ring is arranged at a mutual distance with adjacent balls in the direction of the thread pitch having their positions spaced along the direction of thread pitch, it is possible to have the thread pitch of the thread grooves smaller than the diameter of the balls, the lead angle of the thread grooves can be small, and as a result a greater multiplication of the operating force is obtained, and effective clamping is obtained.

According to the invention of claim 4 of the invention, in addition to the effect of the invention of said claim 1, when the operating ring enters the clamping state, the raised parts and the contact parts slip against each other due to the relative rotation between the operating ring and the adjustment ring, generating an adjustment and an adjustment noise, and it is possible to verify the clamping state by this adjustment and adjustment noise.

In another embodiment, the invention of claim 5 of the invention is characterised by being a clamp screw which is provided with a threaded member with a threaded part having a female or male thread formed on a shaft part and which screws onto a threaded attachment part, and with a shaft-shaped peripheral part formed on its outer surface, an operating ring whose inner part is inserted over the shaft-shaped peripheral part of said threaded member and to which a rotational force is input externally, and a flange ring fitted facing said operating ring so as to freely rotate on said shaft-shaped peripheral part of said threaded member and permitted a slight movement in the axial direction, and in contact with the attached object, thread grooves of the same respective thread pitch being engraved into the inserted and engaged inner and outer surfaces of said threaded member and operating ring, a plurality of balls being fitted into said thread grooves, a restraining ring being installed between said operating ring and flange ring with slight freedom of movement in the axial direction with respect to the threaded member but prevented from rotating, and a spring means being fitted between said restraining ring and operating ring, which returns said operating ring to its initial position allowing for the set number of turns in the clamping range.

The invention of claim 6 of the invention, in addition to the structure of the invention of claim 5, is characterised by being a clamp screw in which a thrust bearing is fitted between said operating ring and restraining ring.

The invention of claim 7 of the invention, in addition to the structure of the invention of claim 5, is characterised by being a clamp screw in which said balls, in addition to being retained by a retaining ring fitted between the respective thread grooves of the threaded member and the operating ring, are arranged at a mutual distance with adjacent balls in the direction of the thread pitch having their positions spaced along the direction of thread pitch.

The invention of claim 8 of the invention, in addition to the structure of the invention of claim 5, is characterised by being a clamp screw in which a thrust bearing is fitted between said operating ring and restraining ring, an adjustment ring is fitted between said thrust bearing and restraining ring, raised parts being formed on one of the circumferences of the respectively opposing surfaces of said adjustment ring and operating ring, contact parts which are able to slip and are sprung against said raised parts being formed on the other.

With the clamp screw of claim 5 of the invention, when the operating ring is rotated with the threaded part of the threaded member screwed onto the threaded attachment part, until the flange ring comes into contact with the object being attached it rotates in the same way as a single threaded member, as it forms a unit through the assembled resistance of the structural elements. Then when the flange ring comes in contact with the object being attached, the rotation of the threaded member stops and it enters the clamping state, the rotation of the operating ring is screw fed due to the balls moving around the thread grooves, and due to this screw feed the movement of the operating ring creates a pressure against the flange ring through the restraining ring, so that this pressure produces a clamping force on the object being attached. Moreover, the rotation of said operating ring during the screw feed of said operating ring has virtually no frictional resistance due to the movement of the balls around the thread grooves, so that the rotative force of the operating ring can be applied to the flange ring effectively with no loss.

When removing the clamp screw, by rotating the operating ring in the opposite direction to the above, the pressure from the said operating ring on the flange ring is released, and the clamping can be loosened, and thereafter it can be removed like a single threaded member. Also there is no loss of rotative power when the operating ring is turned in reverse, since the balls move around the thread grooves. Furthermore, when the load is removed from the operating ring on the flange ring side, the operating ring returns to its initial position with respect to the threaded member due to the spring means.

With the clamp screw of claim 6 of the invention, in addition to the effect of the invention of said claim 5, there is virtually no frictional resistance between the operating ring and the restraining ring, so that the rotational force of the operating ring can be transmitted to the flange ring effectively and without loss.

With the clamp screw of claim 7 of the invention, in addition to the effect of the invention of said claim 5, the position of the balls is maintained by the retaining ring, ensuring the balls have a smooth turning movement.

With the clamp screw of claim 8 of the invention, in addition to the effect of the invention of claim 5, when the operating ring enters the clamping state, the adjustment ring also receives the pressure between the operating ring and stops rotating, and due to its stopping a relative rotation takes place between the operating ring and the adjustment ring, and adjustment and an adjustment noise is generated by slippage between the raised parts and the contact part, and the clamping state can be verified by this adjustment and adjustment noise.

According to the invention of claim 5 of the invention, when the flange ring comes into contact with an attached tool, the rotation of the threaded member stops and it enters a clamping state, the rotation of said operating ring during screw feed of the operating ring has virtually no frictional resistance due to the movement of the balls around the thread grooves, so the rotational force of the operating ring can be transmitted effectively and without loss to the flange ring, it is possible to fix the clamp strongly even with a small rotational force, and manual operation can be made to exert a sufficient clamping force.

According to the invention of claim 6 of the invention, in addition to the effect of the invention of said claim 5, since there is virtually no frictional resistance between the operating ring and the restraining ring during said clamping state because of the thrust bearing, there is no loss in rotational force in said part, and a small operating force such as a hand movement can be made more efficiently and effectively to have sufficient effect as a clamping force.

According to the invention of claim 7 of the invention, in addition to the effect of the invention of said claim 5, since the spacing of the balls in the retaining ring is arranged at a mutual distance with adjacent balls in the direction of the thread pitch having their positions spaced along the direction of thread pitch, it is possible to have the thread pitch of the thread grooves smaller than the diameter of the balls, the lead angle of the thread grooves can be small, and as a result a greater multiplication of the operating force is obtained, and effective clamping is obtained.

According to the invention of claim 8 of the invention, in addition to the effect of the invention of said claim 5, when the operating ring enters the clamping state, the raised parts and the contact parts slip against each other due to the relative rotation between the operating ring and the adjustment ring, generating an adjustment and an adjustment noise, and it is possible to verify the clamping state by this adjustment and adjustment noise.

PREFERRED EMBODIMENTS

Preferred embodiments of the invention will now be described based on the drawings.

Figure 1:
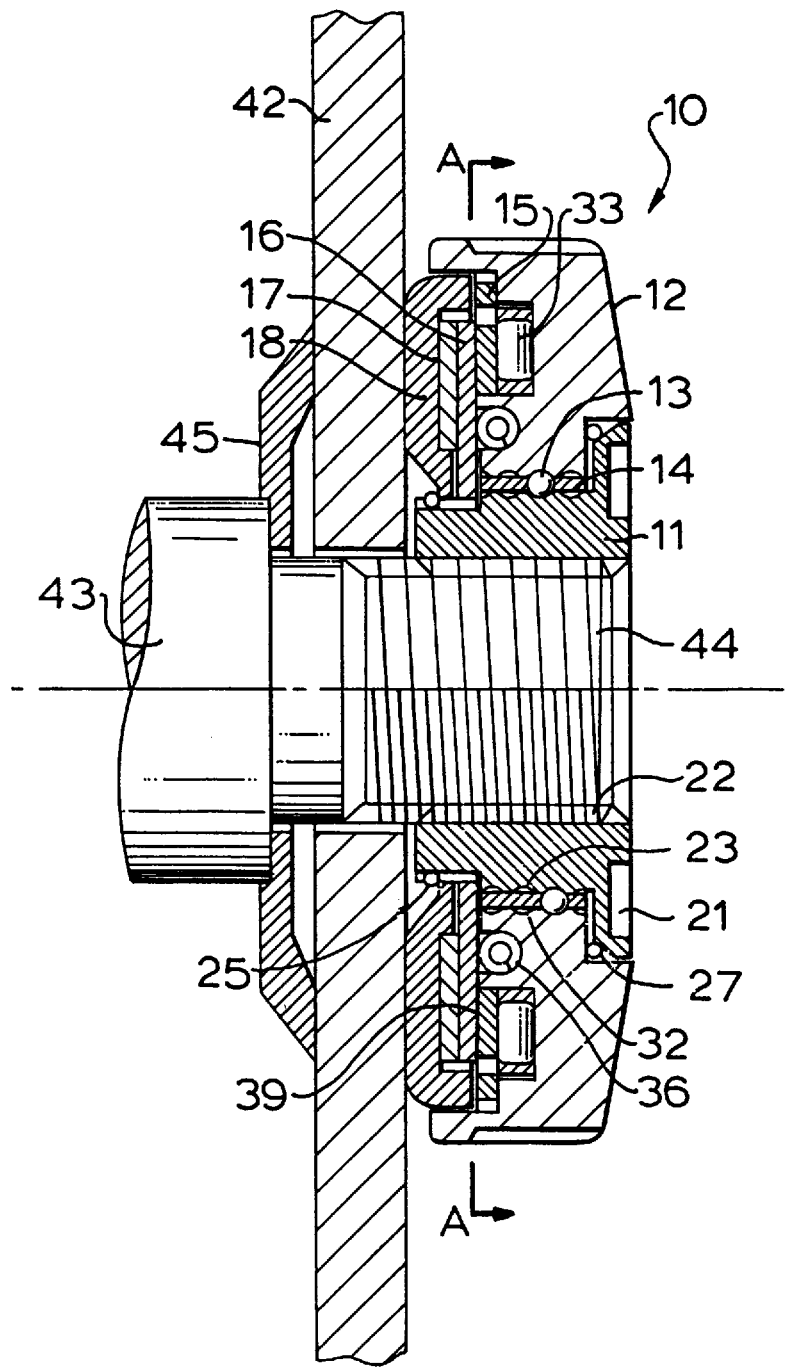
FIG. 1 is a cross section of the clamp screw.
Figure 2:
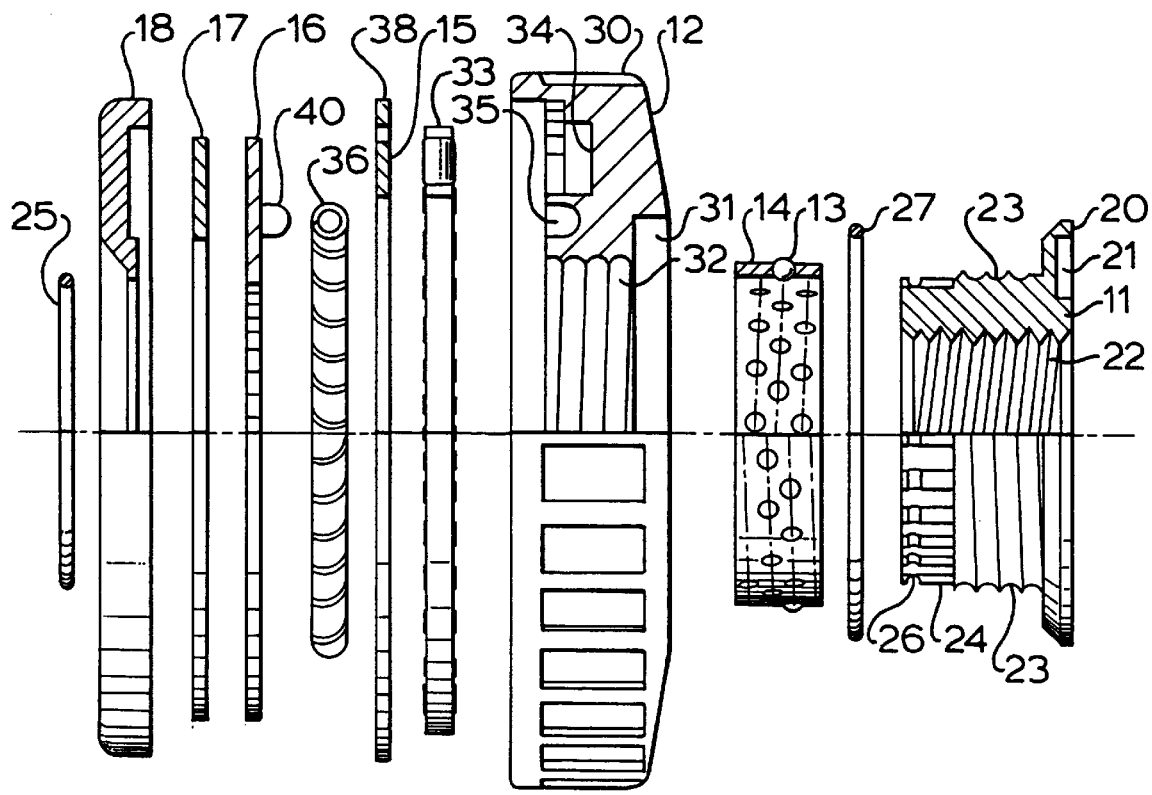
FIG. 2 is an exploded diagram with parts above the centre line in cross section.
Figure 3:
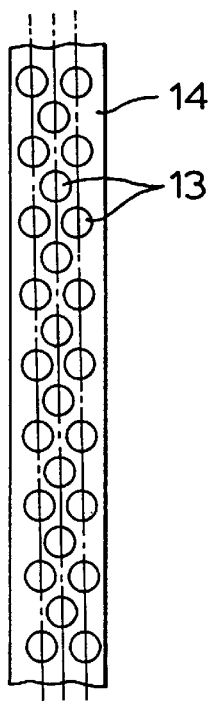
FIG. 3 is a development with part of the retaining ring omitted.

The drawings show a clamp screw 10, and in FIGS. 1 and 2 claim screw 10 is provided with cylindrical threaded member 11, ring-shaped operating ring 12, cylindrical retaining ring 14 which retains balls 13, disk-shaped adjustment ring 15, disk-shaped restraining ring 16, disk-shaped dry metal 17, and ring-shaped flange ring 18.

At the end of said threaded member 11 is formed a collar part 20, engagement holes 21 for a wrench being formed in the outer surface of this collar part 20 at an appropriate spacing. Female thread 22 is formed on the shaft of said threaded member 11, arc-shaped thread grooves 23 for the movement of above-mentioned balls 13 being formed in the circumference of the shaft on the inner side of said collar part 20, and furthermore on its outside surface are formed spline slots 24 which engage with the above-mentioned restraining ring 16, and ring slots 26 which stop stopping ring 25. Element 27 is an O-ring to provide a seal.

The above-mentioned operating ring 12 is a ring to which rotational force is input, and is inserted over the shaft-shaped periphery of said threaded member 11, knurl 30 being formed on its outer surface to prevent slipping, and on its outside surface is formed depression 31 into which fits collar part 20 of threaded member 11 with the above-mentioned O-ring 27 installed, and moreover on the inner surface are formed arc-shaped thread grooves 32 for said balls 13 to move around and which have the same thread pitch as said thread grooves 23, and furthermore on the inside surface is formed depression 34 which accommodates thrust bearing 33, thrust bearing 33 thus accommodated being in contact with the side of adjustment ring 15 mentioned above. Groove 35 is for accommodating spring 36 to be described later. Furthermore said thread grooves 23, 32 need not be arc-shaped but may be the conventional triangular shape.

The above-mentioned balls 13 are retained within retaining ring 14 so as to be able to rotate around with a plurality of balls spaced at the required intervals, and moreover balls 13 are arranged at a mutual distance with adjacent balls 13, 13 in the direction of the thread pitch having their positions spaced without clustering along the direction of thread pitch, and by having this structure it is arranged that the width of the thread pitch can be formed smaller than the diameter of balls 13. The lead angle of screw grooves 23, 32 is set smaller than the lead angle of female thread 22 of said threaded member 11, and moreover it is preferable that said lead angle be formed at an angle of 1.5° or less to avoid loosening caused by vibration.

Figure 4:
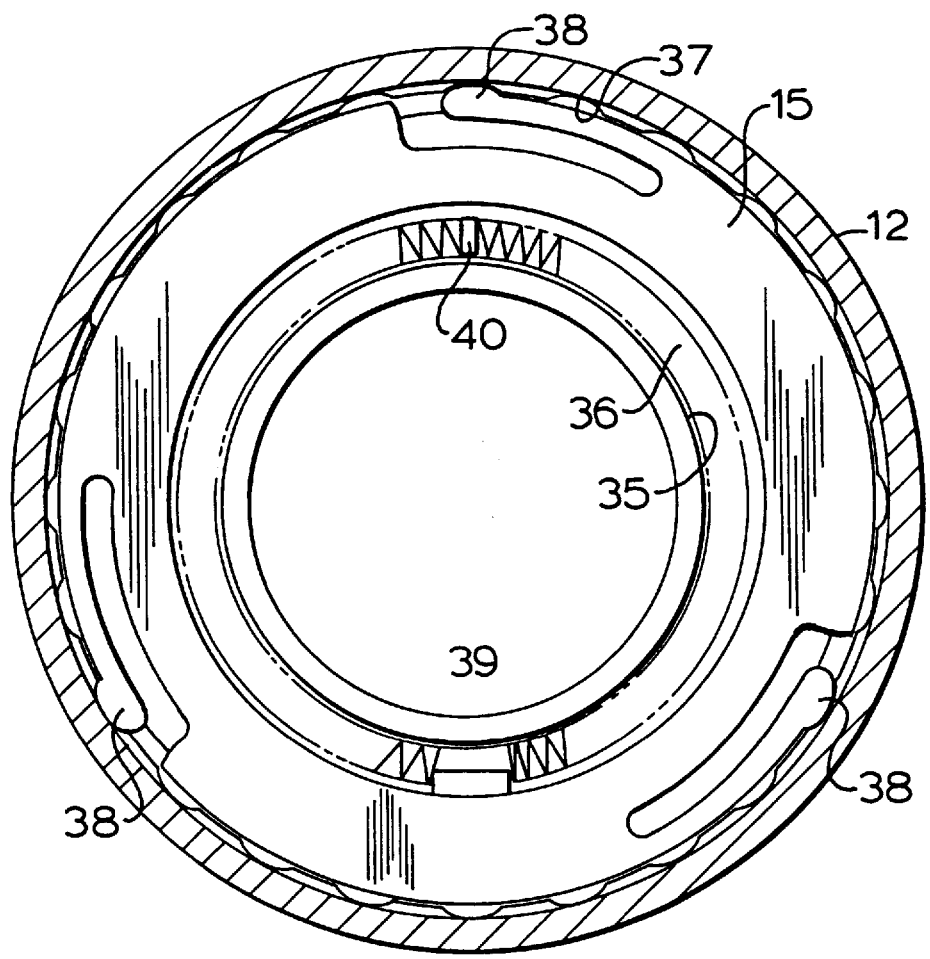
FIG. 4 is a cross section through line A—A in FIG. 1.

As shown in FIG. 4, raised parts 37 are formed on the inner surface of the inside of the above-mentioned operating ring 12, and contact parts 38 formed in three positions on the outer surface of adjustment ring 15 are made to engage with these raised parts 37. The above-mentioned contact parts 38 have an elasticity through being formed via a long neck from said adjustment ring 15, and due to this elasticity contact parts 38 are sprung against said raised parts 37, and when these raised parts 37 and contact parts 38 rotate against one another, in addition to obtaining adjustment of the rotation of operating ring 12, an adjustment noise is generated due to the engagement of contact parts 38 in the depressions.

Figure 5:
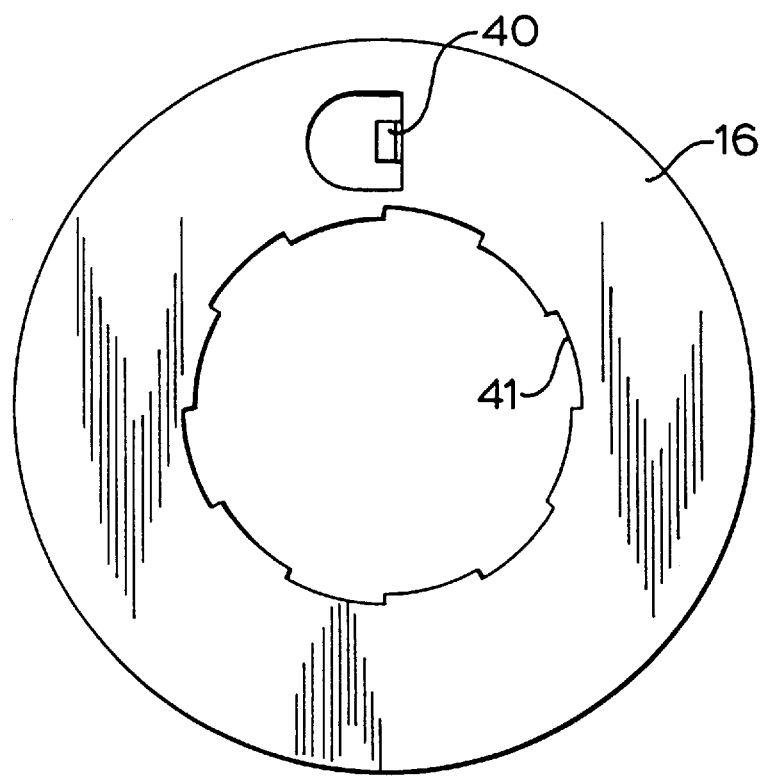
FIG. 5 is a plan view of adjustment ring.

In housing groove 35 of the above-mentioned operating ring 12 is a stopper 39, this stopper 39 being restrained by both ends of spring 36 accommodated in housing groove 35. In the middle of this spring 36, as shown in FIG. 5, is fitted restrainer 40 which is formed in the above-mentioned restraining ring 16, and sprung so that said operating ring 12 can be returned to its initial position when the clamping load is released from operating ring 12.

Said restraining ring 16 has spline grooves 41 formed on its inner surface, which engage with spline grooves 24 of above-mentioned threaded member 11, and even with slight movement permitted in the axial direction of said threaded member 11, is fitted to threaded member 11 so that rotation is prevented.

Disk-shaped dry metal 17 has the coefficient of friction of its surface set at the required value, the value being adjusted up to a level where the clamping of operating ring 12 due to the reaction of rotating tool 42 on thread grooves 23, 32 is not excessive, and is set so that the value ensuring slipping occurs with further rotation.

The above-mentioned flange ring 18 is fitted to rotate at the end of spline grooves 24 of threaded member 11 with a slight degree of movement permitted in the axial direction, its outside surface applying clamping pressure against rotating tool 42.

A male thread 44 for attachment is engraved in the end of drive shaft 43 of the electric tool, rotating tool 42 being fitted to this male screw 44 via an inner flange 45, and is fixed on using a clamp screw 10 of a structure as described above.

In other words female thread 22 of threaded member 11 is screwed onto male screw 44 of drive shaft 43. In a state where the flange ring 18 is not in contact with rotating tool 42, in other words where no load is applied to said flange ring 18, it is screwed on just like a single nut, rotating as a unit through the assembled resistance of the structural elements of clamp screw 10.

When flange ring 18 comes into contact with the side of rotating tool 42 and stops, the rotation of threaded member 11 also stops simultaneously, at which point a clamping state is entered. In other words if operating ring 12 is further rotated in the direction of clamping in this state, balls 13 retained in retaining ring 14 move around thread grooves 23, 32, and operating ring 12 is screw fed. Moreover, the movement of these balls 13 has virtually no frictional resistance, so the rotation of operating ring 12 can be effectively transmitted without loss of the operating force.

The screw feed of the above-mentioned operating ring 12 applies pressure through thrust bearing 33 to adjustment ring 15, restraining ring 16 and dry metal 17, and furthermore exerts pressure on flange ring 18 so that rotating tool 42 is firmly clamped.

When the above-mentioned operating ring 12 enters a clamping state, since restraining ring 16 does not rotate, when operating ring 12 rotates spring 36 is compressed in the direction of clamping.

When operating ring 12 is clamped in the above-described fashion, it is possible to set the angle of rotation to approximately 90° with a movement of the operating ring 12 that is within as little as 0.5 mm in the axial direction. Furthermore as the rotation of operating ring 12 is transmitted effectively and without loss of operating power, a strong fixed clamping can be obtained from a small rotational force (operating force) and sufficient clamping can be obtained from manual operation.

Moreover there is virtually no friction with adjustment ring 15 with respect to the rotation of operating ring 12 due to thrust bearing 33 being fitted, so there is no loss of this part of the force and it can make the rotation of the operating ring more effective.

As described above, when operating ring 12 is rotated in the clamping state, at this point adjustment ring 15 comes under pressure and stops, so that a relative movement against operating ring 12 occurs, with raised parts 37 on the inside surface of operating ring 12 riding over contact parts 38 of adjustment ring 15 and rotating, an adjustment and an adjustment noise being obtained from operating ring 12 each time they ride over, and as a result of this contact the operator is able to confirm that a clamping state has been achieved.

When rotating tool 42 has been fixed as described above and this rotating tool 42 is used, the reverse thrust caused by the resistance in use is transmitted to flange ring 18, and this is rotated in the direction of clamping. This reverse rotation is transmitted to said dry metal 17 and restraining ring 16 through adjustment ring 15 until dry metal 17 slips, and a relative rotation in the direction of clamping occurs between this adjustment ring 15 and operating ring 12, the mutual clamping force is increased, and due to this increased clamping force (extra clamping) a more effective clamping can be obtained. However, where a reverse rotation greater than the coefficient of friction set for dry metal 17 occurs, slipping will occur between this dry metal 17 and flange ring 18, so that over-clamping can be prevented.

When removing clamp screw 10 attached as described above, operating ring 12 is rotated in the direction of loosening. Whilst the flange ring 18 is in contact with rotating tool 42, this rotation also causes screw feed of operating ring 12 due to balls 13 and thread grooves 23, 32. Moreover, due to the fact that there is virtually no frictional resistance due to the rotation of the balls 13, this screw feed is effectively transmitted with a small manual rotational force so that clamping and loosening are possible.

Moreover, when the clamping of flange ring 18 is released, clamp screw 10 rotates as a unit due to the assembled resistance of the structural elements, the rotation of operating ring 12 becomes the rotation of threaded member 11, and female thread 22 of said threaded member 11 can be removed from male thread 44 of drive shaft 43.

Furthermore, when the clamping load is released from operating ring 12, the elastic force of compressed spring 36 returns operating ring 12 to its initial waiting position with respect to restraining ring 16.

In the embodiment described above, when flange ring 18 comes into contact with rotating tool 42, the rotation of threaded member 11 stops and it enters a clamping state, the rotation of said operating ring 12 during screw feed of operating ring 12 has virtually no frictional resistance due to the movement of balls 13 around thread grooves 23, 32, so the rotational force of operating ring 12 can be transmitted effectively and without loss to flange ring 18, it is possible to fix the clamp strongly even with a small rotational force, and manual operation can be made to exert a sufficient clamping force.

Moreover, as dry metal 17 is fitted, a more effective clamping is obtained due to the increased clamping force (extra clamping) resulting from the reverse rotation of rotating tool 42.

In addition, when the reverse rotation is greater than the level at which the coefficient of friction of dry metal 17 has been set, slippage occurs between this dry metal 17 and the flange ring 18, thus preventing over-clamping.

Moreover, since there is virtually no frictional resistance between operating ring 12 and restraining ring 16 during the above-mentioned clamping state because of thrust bearing 33, there is no loss of rotational force in said part, and a small operating force such as a hand movement can be made more efficiently and effectively to have sufficient effect as a clamping force.

Furthermore, since the spacing of balls 13 in retaining ring 14 is arranged at a mutual distance with adjacent balls 13 in thread grooves 23, 32 in the direction of the thread pitch having their positions spaced along the direction of thread pitch, it is possible to have the thread pitch of thread grooves 23, 32 smaller than the diameter of balls 13, the lead angle of thread grooves 23, 32 can be small, and as a result a greater multiplication of the operating force is obtained, and effective clamping is obtained.

Moreover, when operating ring 12 enters the clamping state, raised parts 37 and contact parts 38 slip against each other due to the relative rotation between operating ring 12 and adjustment ring 15, generating an adjustment and an adjustment noise, and it is possible to verify the clamping state by this adjustment and adjustment noise.

Key

- 10—clamp screw
- 11—threaded member
- 12—operating ring
- 13—ball
- 14—retaining ring
- 15—adjustment ring
- 16—restraining ring
- 17—dry metal
- 18—flange ring
- 23, 32—thread grooves
- 33—thrust bearing
- 36—spring
- 37—raised parts
- 38—contact parts
- 40—restrainer With respect to the correspondence of the structure of this invention with the embodiment described above, even where the spring means of the invention corresponds to restrainer 40 and spring 36 of the restraining ring 16 of the embodiment, the structure of the invention is not limited only to the structure of the above embodiment. For example, female thread 22 of threaded member 11 may be replaced with a male thread.

What is claimed is:

1. A clamp screw for clamping a rotating member or the like, said clamp screw comprising:
    a threaded member with a female or male thread formed on a portion thereof for engagement with at least a portion of the device to which the rotating member is clamped;
    a flange member axially aligned with said threaded member and defining a tool contacting surface, said flange member being axially movable with respect to said threaded member;
    an operating ring disposed about said threaded member and configured for receiving an applied rotational force to operate said clamp screw; and
    a ball screw transmission mechanism between said operating ring and said threaded member, said ball screw transmission mechanism configured to transfer rotational movement of said operating ring to axial movement of said flange member for actuating said clamp screw.

2. A clamp screw for clamping a rotating member or the like as in claim 1, wherein said threaded member includes ball receiving grooves thereon for receipt of balls from the ball screw transmission mechanism.

3. A clamp screw for clamping a rotating member or the like as in claim 1, wherein said threaded member comprises a nut having female threads defined therein for threaded engagement with male threads on the device to which the rotating member is clamped.

4. A clamp screw for clamping a rotating member or the like as in claim 1, wherein said threaded member comprises a bolt having male threads defined thereon for threaded engagement with female threads defined on said device to which the rotating member is clamped.

5. A clamp screw for clamping a rotating member or the like as in claim 1, wherein said flange member comprises a flange ring disposed adjacent an axial end of said threaded member.

6. A clamp screw for clamping a rotating member or the like as in claim 1, wherein said ball screw transmission mechanism includes an inner ball groove race and an outer ball groove race with balls received therebetween.

7. A clamp screw for clamping a rotating member or the like as in claim 6, wherein said inner ball groove race is defined by an outer surface of a portion of said threaded member.

8. A clamp screw for clamping a rotating member or the like as in claim 6, wherein said outer ball groove race is defined by an inner surface of said operating ring.

9. A clamp screw for clamping a rotating member or the like as in claim 6, wherein said balls are maintained in a cage.

10. A clamp screw for clamping a rotating member or the like as in claim 1, and further including a restraining ring between said operating ring and said flange member, said restraining ring being configured for limited movement in the axial direction with respect to said threaded member, but prevented from rotating with respect to said threaded member.

11. A clamp screw for clamping a rotating member or the like as in claim 10, and further including a return spring between said restraining ring and said operating ring.

12. A clamp screw for clamping a rotating member or the like as in claim 11, and further including a frictional resistance ring between said restraining ring and said flange ring for providing a controlled frictional resistance therebetween.

13. A clamp screw for clamping a rotating tool or the like to a drive spindle, said clamp screw comprising:
    a threaded body member with a thread formed on an inner portion thereof for engagement with a mating thread on a drive spindle;
    a flange member axially aligned with said threaded member and defining a tool contacting surface, said flange member being axially movable with respect to said threaded member;
    an operating ring disposed about said threaded member and configured for receiving an applied rotational force to operate said clamp screw; and a ball screw transmission mechanism between said operating ring and said threaded member, said ball screw mechanism including an inner ball groove integral with an outer surface of said threaded member and an outer ball groove integral with an inner surface of said operating ring and a plurality of balls located therebetween, said inner and outer ball grooves directly contacting said balls.

14. A clamp screw for clamping a rotating tool or the like to a drive spindle as in claim 13, and further including a restraining ring between said operating ring and said flange member, said restraining ring being configured for limited movement in the axial direction with respect to said threaded member, but prevented from rotating with respect to said threaded member.

15. A clamp screw for clamping a rotating tool or the like to a drive spindle as in claim 14, and further including a return spring between said restraining ring and said operating ring.

16. A clamp screw for clamping a rotating tool or the like to a drive spindle as in claim 15, and further including a frictional resistance ring between said restraining ring and said flange ring for providing a controlled frictional resistance therebetween.

* * * * *